United States Patent
Kwan et al.

(10) Patent No.: US 8,090,932 B1
(45) Date of Patent: *Jan. 3, 2012

(54) COMMUNICATION BUS WITH HIDDEN PRE-FETCH REGISTERS

(75) Inventors: Kevin Kwan, Irvine, CA (US); Michael R. Spaur, Irvine, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/917,426

(22) Filed: Nov. 1, 2010

Related U.S. Application Data (63) Continuation of application No. 11/517,927, filed on Sep. 8, 2006, now Pat. No. 7,827,387.

(51) Int. Cl.
  *G06F 9/00* (2006.01)
(52) U.S. Cl. ........................................ 712/220
(58) Field of Classification Search ................... 712/220
See application file for complete search history.

(56) References Cited

U.S. PATENT DOCUMENTS

| | | | | |
|---|---|---|---|---|
| 5,557,750 A | * | 9/1996 | Moore et al. | 710/310 |
| 5,829,042 A | * | 10/1998 | Leung | 711/147 |
| 6,718,454 B1 | * | 4/2004 | Ebner et al. | 711/213 |
| 6,738,867 B1 | | 5/2004 | Kanai | |

* cited by examiner

*Primary Examiner* — Alford W. Kindred
*Assistant Examiner* — Benjamin Geib (57) ABSTRACT

A system-on-chip including a processor, a control module, a first plurality of data registers, a second plurality of data registers, a plurality of address registers, and a first control module. The first plurality of data registers are configured to store data. The processor is configured to respectively write addresses corresponding to selected ones of the first plurality of data registers in the plurality of address registers. The second plurality of data registers are configured to receive data from the selected ones of the first plurality of data registers. In response to a request from the processor for a first address, the first control module is configured to provide data to the processor from the second plurality of data registers in response to the first address matching an address stored in the plurality of address registers, and otherwise provide data to the processor from the first plurality of data registers.

19 Claims, 8 Drawing Sheets

COMMUNICATION BUS WITH HIDDEN PRE-FETCH REGISTERS

CROSS-REFERENCE TO RELATED APPLICATIONS

This application claims the benefit of U.S. patent application Ser. No. 11/517,927 filed Sep. 8, 2006, the disclosure thereof incorporated by reference herein in its entirety.

FIELD

The present disclosure relates to reading register data in a digital system.

BACKGROUND

In computer systems it is generally desirable to read and write data as quickly as possible. While advances have been made in access speeds of memory such as RAM and ROM, there remains a need in the art to accelerate read cycles from peripheral devices such as hard disk drives.

Figure 1:
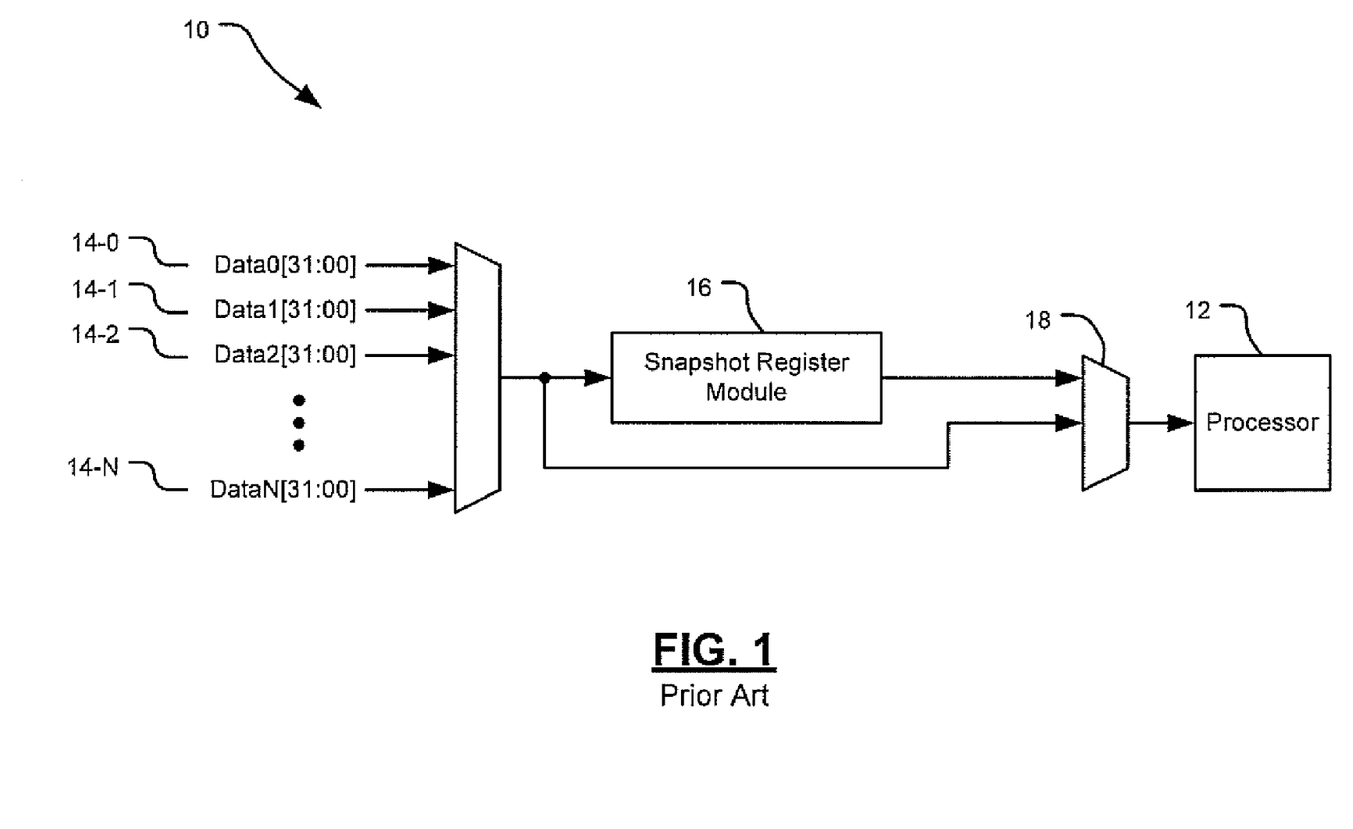
FIG. 1 is a functional block diagram of a communication bus according to the prior art.

Referring now to FIG. 1, a communication bus 10 is shown for a hard disk drive controller (not shown). Communication bus 10 provides a communication link between a processor 12 and data registers 14-0 through 14-N, collectively referred to as data registers 14. Each of data registers 14 can be associated with a different module of the hard disk controller. For example, data register 14-0 can be associated with a servo control module that positions a read-write head of a hard disk drive. Data register 14-1 can be associated with a diagnostic module of the hard disk drive, and so forth.

Processor 12 executes multiple steps to read data from one of data registers 14. For example, processor 12 first designates the module that is associated with the selected data register 14 that will be read. Processor 12 then specifies an address or address offset of the selected data register 14. A snapshot register module 16 captures the data from selected data register 14. Processor 12 can then read the data from snapshot register module 16 via a multiplexer 18. This process can take several clock cycles and may prevent processor 12 from attending to other tasks while it is reading from the selected one of data registers 14.

SUMMARY

A system-on-chip (SOC) includes a processor, a controller module for a hard disk drive, and a communication bus that provides a communication link between the processor and the controller module. The communication bus includes a first multiplexer that includes a first output and a first input that receives data from a selected one of N registers associated with the controller module and propagates the data to the first output, M address registers that store addresses of up to M ones of the N registers, M data registers that receive pre-fetch data that corresponds to the data from the first output from the M ones of the N registers, and a second multiplexer that includes a second output and that reads the pre-fetch data from the M data registers and propagates the pre-fetch data to the second output. M and N are positive integers greater than two and N is greater than M.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
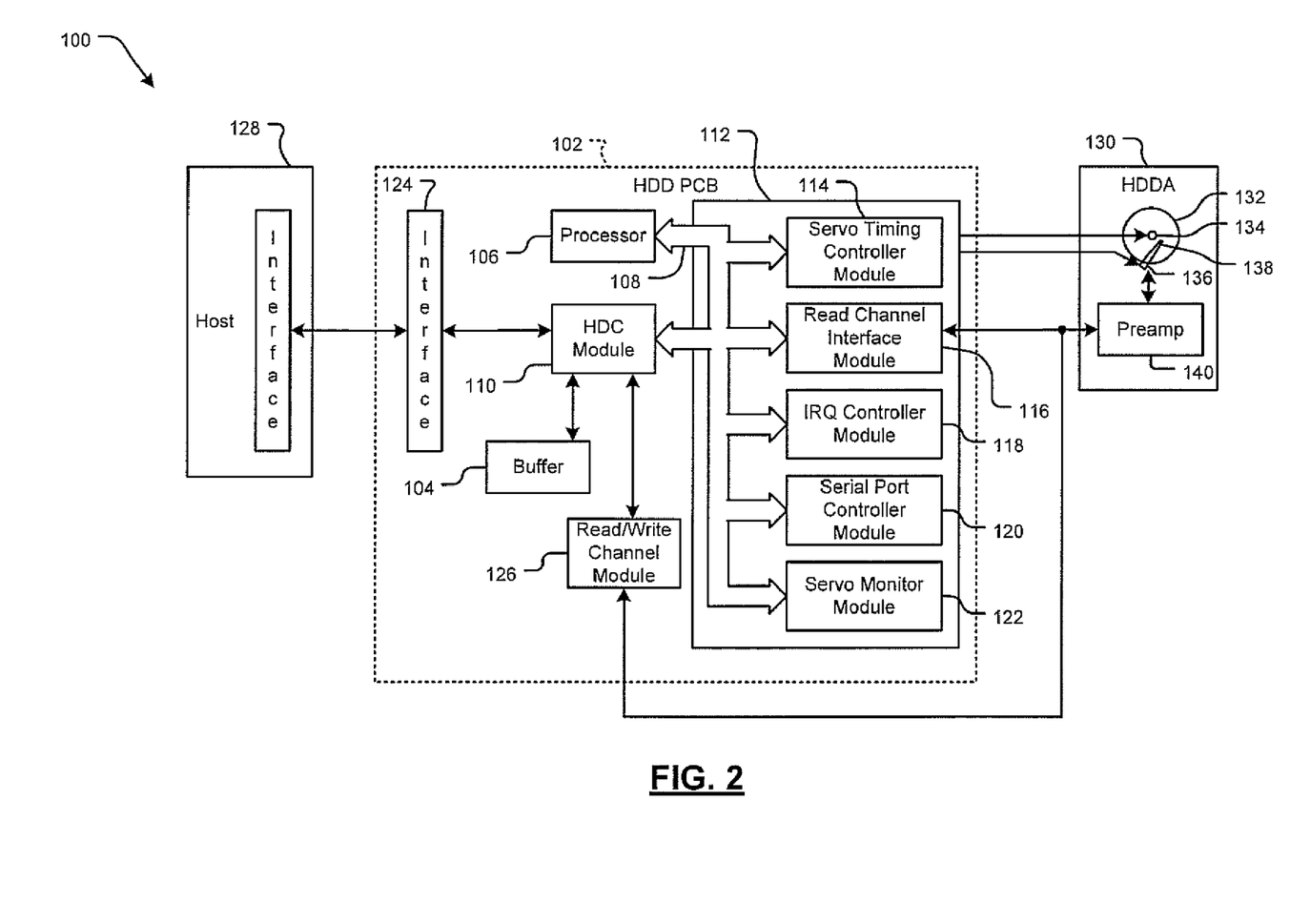
FIG. 2 is a functional block diagram of a hard disk drive (HDD) system according to the present disclosure.

Referring now to FIG. 2, an exemplary hard disk drive (HDD) system 100 is shown. HDD system 100 implements hidden pre-fetch cycles. The hidden pre-fetch cycles, which are described below, decrease the number of clock cycles needed to read data from predetermined data registers and can be used to increase the data throughput of HDD system 100.

HDD system 100 can include a HDD printed circuit board (PCB) 102. A memory module, such as buffer 104, stores read, write and/or volatile control data that is associated with the control of HDD system 100. Buffer 104 usually employs volatile memory having low latency. For example, SDRAM, double data rate (DDR), or other types of low latency memory may be used. Nonvolatile memory such as flash memory may also be provided to store critical data such as nonvolatile control code.

A processor 106 can be arranged on HDD PCB 102. Processor 106 performs data and/or control processing that is related to the operation of HDD system 100. Processor 106 communicates with a communication bus 108. Communication bus 108 provides a communication path between processor 106, a hard disk control (HDC) module 110, and a spindle/ voice coil motor (VCM) driver or module 112. Spindle/VCM module 112 can include a servo timing controller module 114, a read channel interface module 116, an interrupt request (IRQ) controller module 118, a serial port controller module 120 and a servo monitor module 122, all of which may communicate with communication bus 108.

HDC module 110 communicates with an input/output interface 124. HDC module 110 coordinates control of spindle/VCM module 112, a read/write channel module 126, processor 106 and data input/output with a host 128 via interface 124.

A hard disk drive assembly (HDDA) 130 includes one or more hard drive platters 132 that include magnetic coatings that store magnetic fields. Platters 132 are rotated by a spindle motor that is schematically shown at 134. Generally spindle motor 134 rotates hard drive platters 132 at a controlled speed during the read/write operations. One or more read/write arms 136 move relative to platters 132 to read and/or write data to/from hard drive platters 132. Spindle/VCM module 112 controls spindle motor 134, which rotates platters 132. Spindle/VCM module 112 also generates control signals that position read/write arms 136, for example using a voice coil actuator, a stepper motor or any other suitable actuator.

Platters 132 include servo data that is recorded at predetermined locations on platters 132. Spindle/VCM module 112 uses the servo data to provide closed loop control of the position of arms 136 with respect to platters 132. Read channel interface module 116 receives the servo data and communicates it onto communication bus 108. Servo timing controller module 114 can use the servo data to provide timing for servo events, such as positioning arms 136. IRQ controller module 118 generates interrupts based on events in servo timing controller module 114 and/or read channel interface module 116. Serial port controller module 120 arbitrates and controls the communications of servo timing controller module 114 and processor 106. Servo monitor module 122 performs debugging and/or testing of spindle/VCM module 112.

During write operations, read/write channel module 126 encodes the data to be written with a read/write device 138. Read/write channel module 126 processes the write signal for reliability and may apply, for example, error correction coding (ECC), run length limited coding (RLL), and the like. During read operations, read/write channel module 126 converts an analog read signal output of read/write device 138 to a digital read signal. The converted signal is then detected and decoded by known techniques to recover the data that was written on platters 132.

Read/write device 138 is located near a distal end of read/write arms 136. Read/write device 138 includes a write element such as an inductor that generates a magnetic field. Read/write device 138 also includes a read element, such as a magneto-resistive (MR) element, that senses the magnetic field on platters 132. HDDA 130 includes a preamplifier circuit or module 140 that amplifies the analog read/write signals. When reading data, preamplifier module 140 amplifies low level signals from the read element and outputs the amplified signal to read/write channel module 126. While writing data, a write current is generated that flows through the write element of read/write device 138. The write current is switched to produce a magnetic field having a positive or negative polarity. The positive or negative polarity is stored by hard drive platters 132 and is used to represent data.

The data is stored on platters 132 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, processor 106 and HDC module 110 may be implemented by a single chip. Spindle/VCM module 112 and/or read/write channel module 126 may also be implemented by the same chip as processor 106, HDC module 110 and/or by additional chips. Alternatively, most of HDD system 100 other than HDDA 130 may be implemented as a system on chip (SOC).

Figure 3:
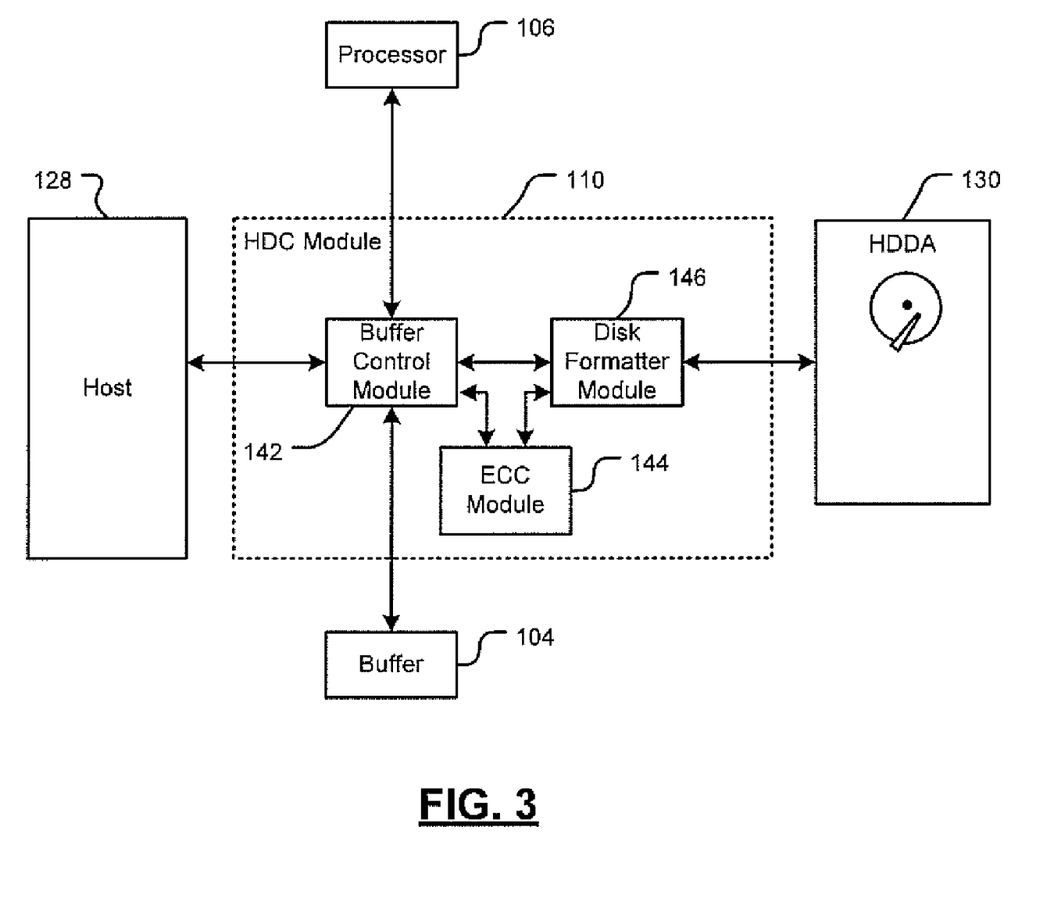
FIG. 3 is a functional block diagram of a hard disk control (HDC) module according to the present disclosure.

Referring now to FIG. 3, HDC module 110 is shown in more detail. HDC module 110 may include a digital signal processor (DSP) and/or other processor that reads data from spindle/VCM module 112. HDC module 110 communicates with buffer 104, processor 106, host 128, and HDDA 130 as described in FIG. 2. HDC module 110 includes a buffer control module 142, an ECC module 144, and a disk formatter module 146.

Buffer control module 142 (e.g. a direct memory access (DMA) controller) connects buffer 104 to disk formatter module 146, ECC module 144, host 128, processor 106, and HDDA 130. Buffer control module 142 regulates data movement in and out of buffer 104.

Host 128 sends read and write commands to HDC module 110. HDC module 110 stores the read and write commands in buffer 104. Processor 106 receives the read and write commands from buffer 104 and executes firmware to control HDC module 110 accordingly. During read operations, HDC module 110 reads data corresponding to the read commands from HDDA 130. Buffer control module 142 and ECC module 144 receive the data from HDDA 130. ECC module 144 provides an ECC mask for errors that may have occurred during read operations while the data is still in buffer control module 142. After any errors in the data are corrected, the data is transferred to buffer 104. The data is then transferred from buffer 104 to host 128.

During write operations, disk formatter module 146 controls writing of data to HDDA 130. Buffer 104 receives data corresponding to the write commands via HDC module 110. Disk formatter module 146 receives the data from buffer 104 via HDC module 110. Disk formatter module 146 formats the data for writing to HDDA 130. For example, disk formatter module 146 adds error correction codes to the data, monitors a position of the read/write elements, and writes the data to the read/write elements as described in FIG. 2.

Figure 4:
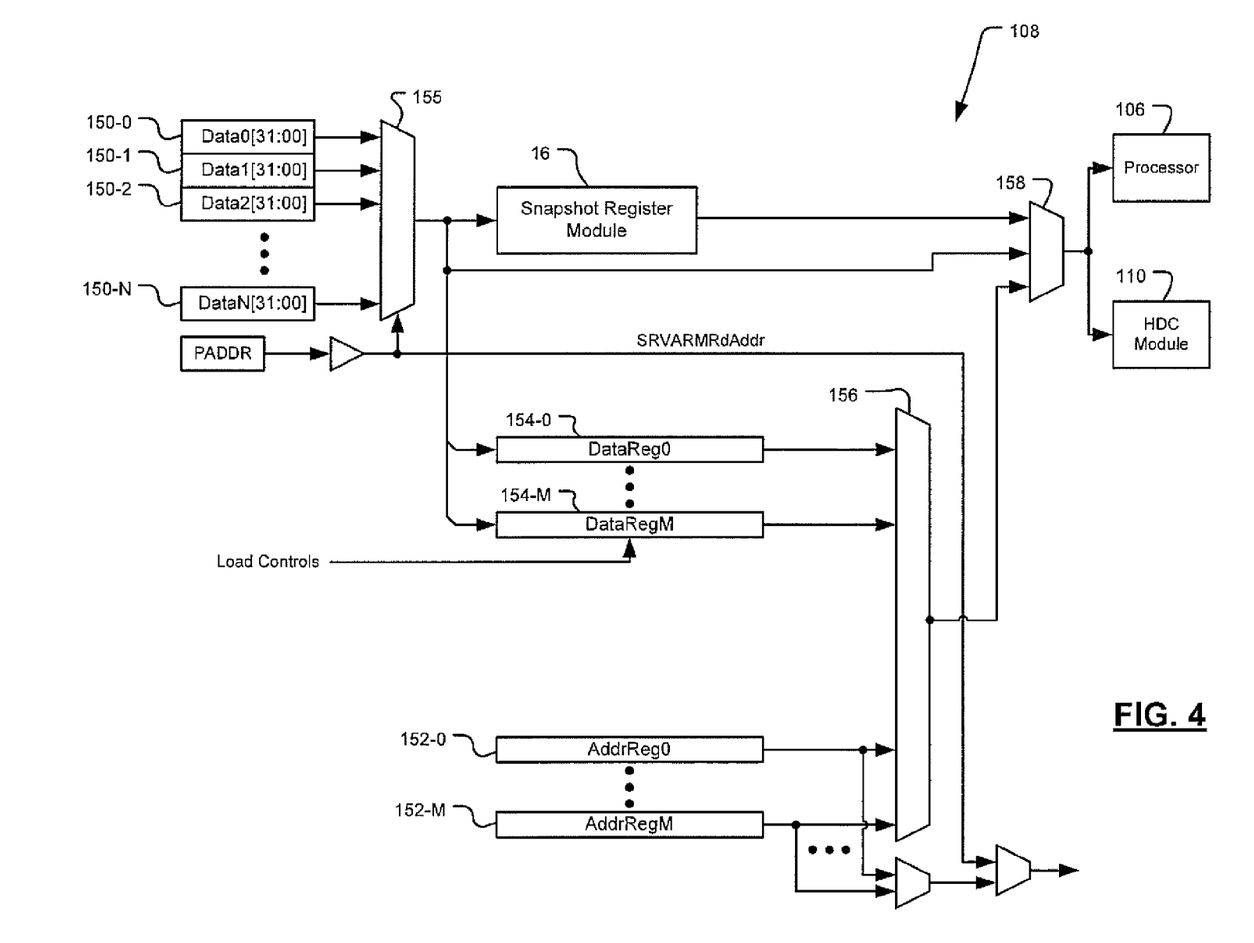
FIG. 4 is a functional block diagram of an interface bus according to the present disclosure.

Referring now to FIG. 4, communication bus 108 is shown in more detail. Data registers 150-0 through 150-N represent various data registers associated with servo timing controller module 114, read channel interface module 116, IRQ controller module 118, serial port controller module 120, and/or servo monitor module 122. Communication bus 108 uses the hidden pre-fetch cycles to decrease the amount of time that it takes processor 106 and/or HDC module 110 to read data from selected ones of data registers 150. The hidden pre-fetch cycles allow processor 106 and/or HDC module 110 to select M of the N data registers 150 which hold data that needs to be read quickly, e.g. quicker than data read from the remaining N-M data registers 150. Once processor 106 and/or HDC module 110 select the M of N data registers 150, communication bus 108 periodically copies the data from the M selected data registers 150 to other registers that can be read quickly by processor 106 and/or HDC module 110. Communication bus 108 performs the periodic copying process without further interaction from processor 106 and/or HDC module 110.

The following description of the hidden pre-fetch cycles assumes HDC module 110 is selecting and reading the data from the M data registers 150, however it should be appreciated that processor 106 can be substituted for, or operate in conjunction with, HDC module 110.

HDC module 110 first writes the address of a selected one of data registers 150 to one of address registers 152-0 through 152-M, collectively referred to as address registers 152. HDC module 110 repeats this process for each of the M data registers 150 that it needs to read from quickly. After HDC module 110 writes the addresses to address registers 152, a first multiplexer 155 periodically copies data from data registers 150 that are pointed to by the addresses written in address registers 152. Multiplexer 155 then writes the copied data to corresponding ones of data registers 154-0 through 154-M without any more interaction from HDC module 110. HDC module 110 can then read the data from data registers 154 via a second multiplexer 156 and a third multiplexer 158 without again needing to specify the modules and addresses of data registers 150. Since communication bus 108 pre-fetches the data from data registers 150 into data registers 154, the read cycle time of HDC module 110 is improved over the prior art when accessing the data in data registers 154.

Figure 5:
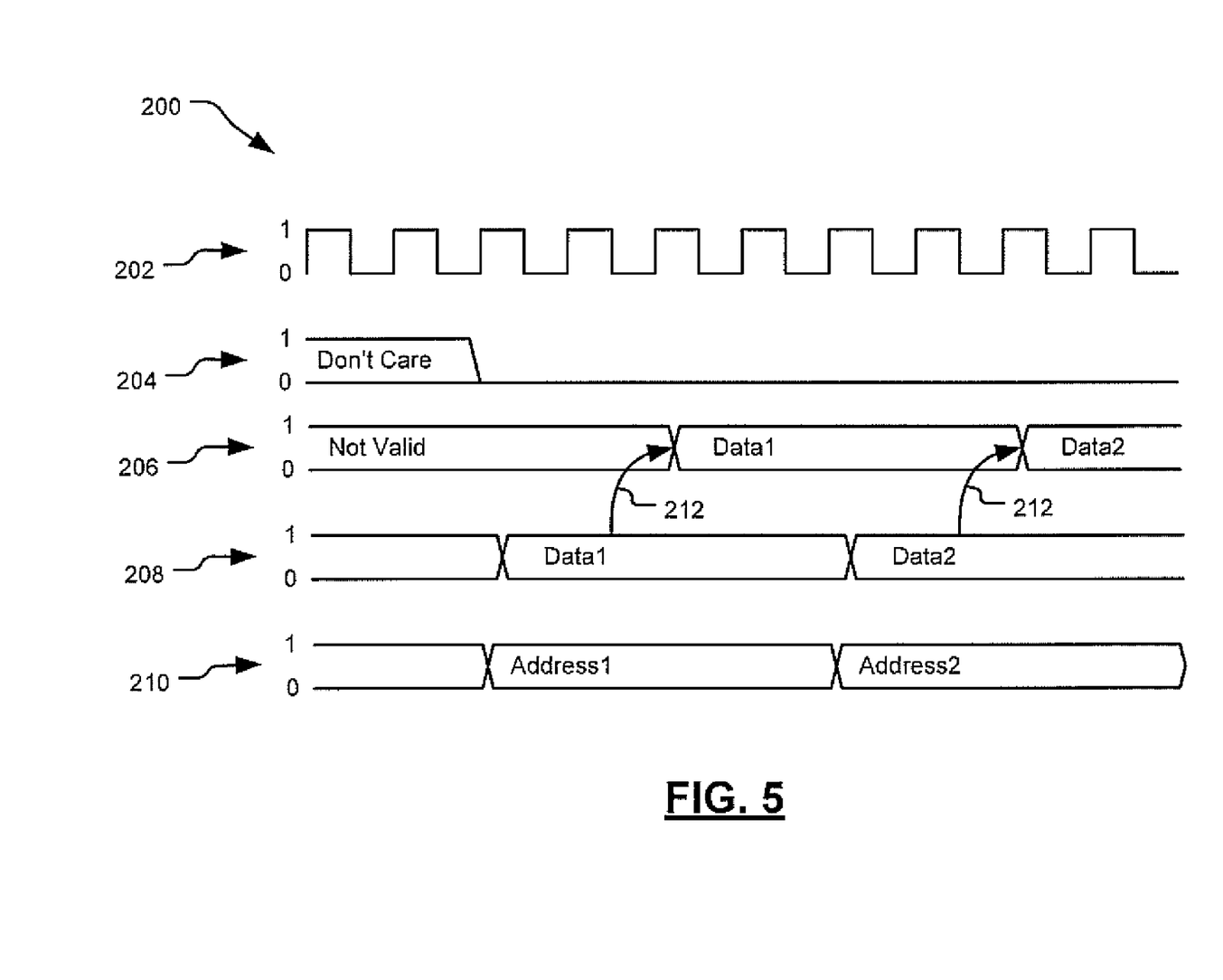
FIG. 5 is a timing diagram of IM bus signals according to the present invention.

Referring now to FIG. 5, a timing diagram 200 shows signals of communication bus 108. A system clock is shown generally at 202. System clock 202 is applied to the various modules of spindle/VCM module 112. A CPU read control signal is shown generally at 204 and is generated by HDC module 110. Data from data registers 154 is shown generally at 206. Data in data registers 150 is shown generally at 208. Addresses of respective ones of data registers 150 are shown generally at 210.

Timing diagram 200 shows that communication bus 108 copies data from data registers 150 into data registers 154 while read control signal 204 is relinquished (e.g. low). When read control signal 204 is relinquished it indicates that HDC module 110 is not reading from the communication bus 108. Pre-fetch cycles are indicated by arrows 212 and are performed by communication bus 108 without further interaction from HDC module 110. The pre-fetch cycles are therefore hidden from HDC module 110.

Figure 6A:
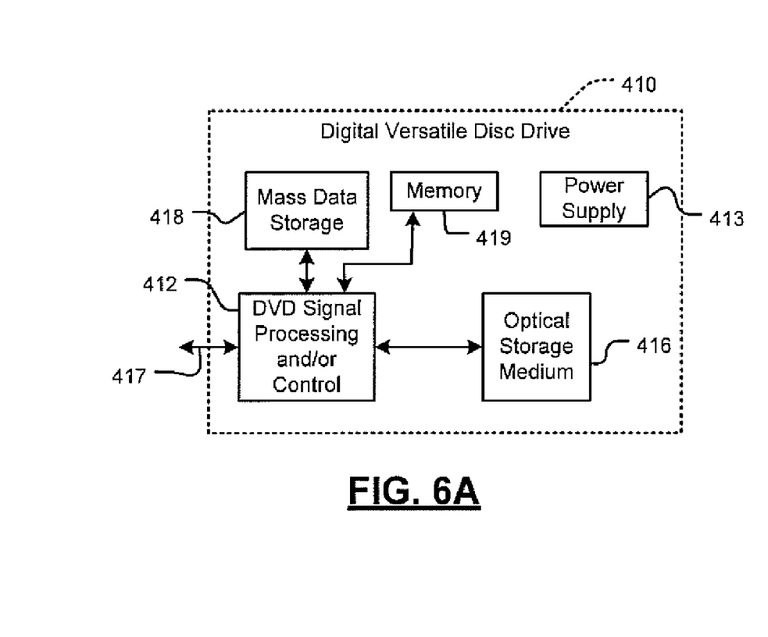
FIG. 6A is a functional block diagram of a digital versatile disk (DVD)

Referring now to FIGS. 6A-6F, various exemplary implementations of communication bus 108 are shown. Referring now to FIG. 6A, a digital versatile disc (DVD) drive 410 is shown. Communication bus 108 may implement and/or be implemented in one or more communications busses that connect to either one or both signal processing and/or control circuit 412 of DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The signal processing and/or control circuit 412 may communicate with mass data storage 418 that stores data in a nonvolatile manner. The mass data storage 418 may include a hard disk drive (HDD). The HDD may have the configuration shown in FIG. 2. The HDD may be a mini HDD that includes one or more platters having a diameter that is smaller than approximately 1.8". The signal processing and/or control circuit 412 may be connected to memory 419 such as RAM, ROM, low latency nonvolatile memory such as flash memory and/or other suitable electronic data storage. The DVD drive 410 may include a power supply 413.

Figure 6B:
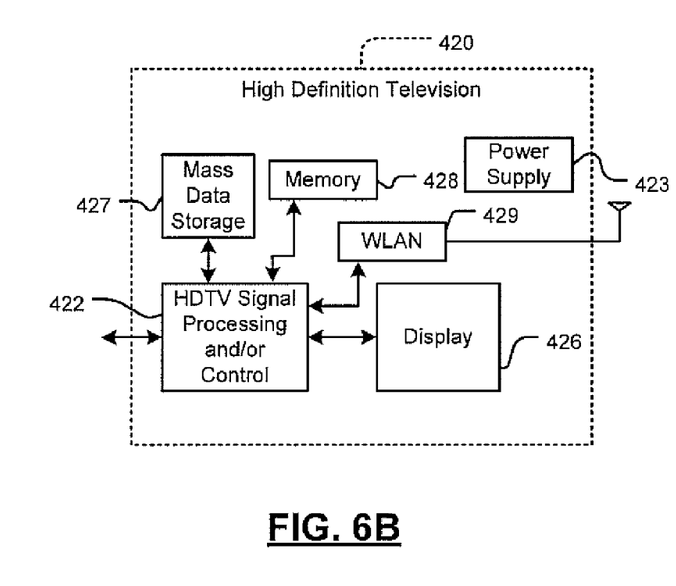
FIG. 6B is a functional block diagram of a high definition television.

Referring now to FIG. 6B, communication bus 108 can be implemented in one or more communications busses that connect to a signal processing circuit and/or a control circuit 422 of a high definition television (HDTV) 420. The HDTV 420 receives HDTV input signals in either a wired or wireless format and generates HDTV output signals for a display 426. In some implementations, the signal processing circuit and/or control circuit 422 and/or other circuits (not shown) of the HDTV 420 may process data, perform coding and/or encryption, perform calculations, format data and/or perform any other type of HDTV processing that may be required.

The signal processing circuit and/or control circuit 422 may communicate with mass data storage 427 that stores data in a nonvolatile manner such as optical and/or magnetic storage devices including hard disk drives (HDDs) and DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The signal processing circuit and/or control circuit 422 may be connected to memory 428 such as RAM, ROM, low latency nonvolatile memory such as flash memory and/or other suitable electronic data storage. The HDTV 420 also may support connections with a WLAN via a WLAN network interface 429. The HDTV 420 may include a power supply 423.

Figure 6C:
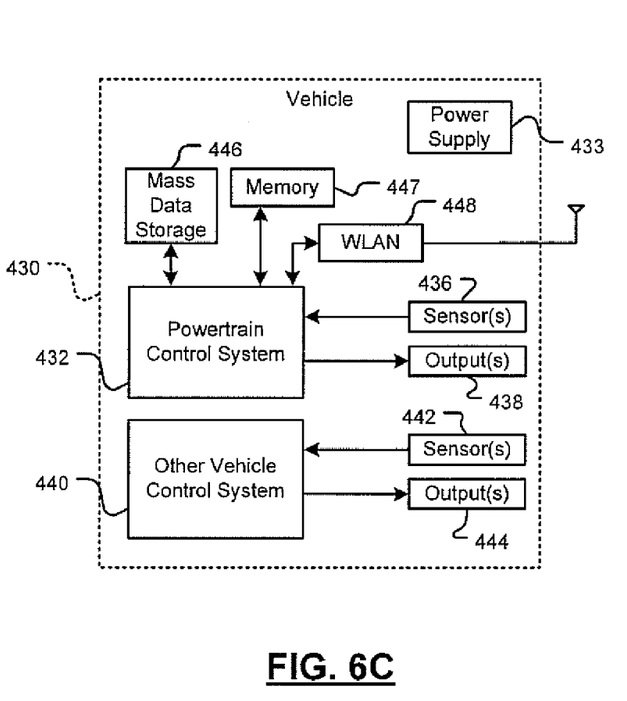
FIG. 6C is a functional block diagram of a vehicle control system.

Referring now to FIG. 6C, communication bus 108 may implement and/or be implemented in one or more communication busses of a control system for vehicle 430. In some implementations communication bus 108 may be implemented in a powertrain control system 432 of the vehicle 430. The powertrain control system 432 receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

Communication bus 108 may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD player, compact disc system and the like. Still other implementations are contemplated.

The powertrain control system 432 may communicate with mass data storage 446 that stores data in a nonvolatile manner. The mass data storage 446 may include optical and/or magnetic storage devices such as hard disk drives (HDDs) and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown). The vehicle 430 may include a power supply 433.

Figure 6D:
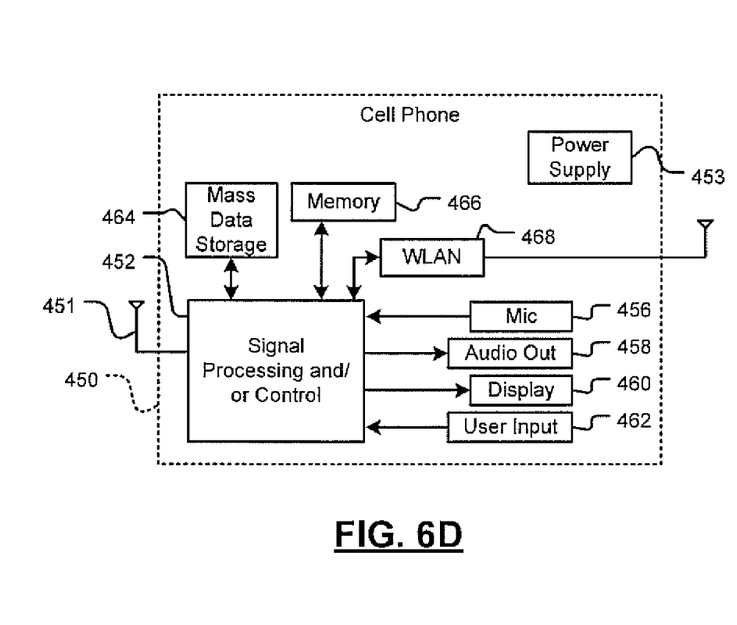
FIG. 6D is a functional block diagram of a cellular phone.

Referring now to FIG. 6D, communication bus 108 can be implemented in a cellular phone 450 that may include a cellular antenna 451. Communication bus 108 may implement and/or be implemented in one or more communications busses that connect to a signal processing and/or a control circuit 452 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuit 452 and/or other circuits (not shown) in the cellular phone 450 may process data, perform coding and/or encryption, perform calculations, format data and/or perform other cellular phone functions.

The signal processing and/or a control circuit 452 may communicate with mass data storage 464 that stores data in a nonvolatile manner such as optical and/or magnetic storage devices including hard disk drives (HDDs) and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The signal processing and/or a control circuit 452 also may connect to a WLAN via a WLAN network interface 468. The cellular phone 450 may include a power supply 453.

Figure 6E:
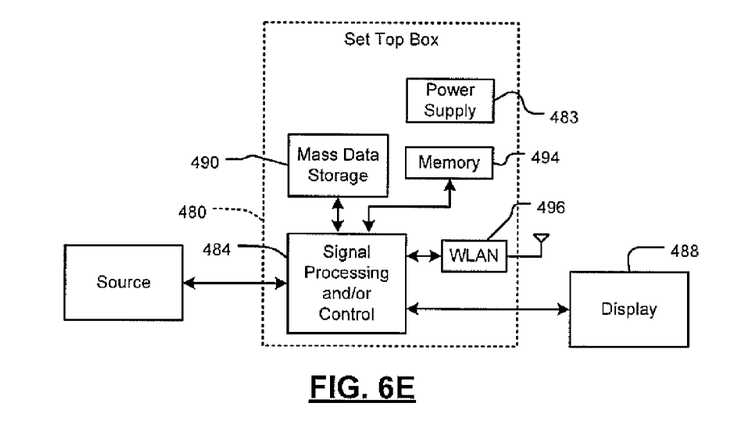
FIG. 6E is a functional block diagram of a set top box.

Referring now to FIG. 6E, communication bus 108 can be implemented in a set top box 480. Communication bus 108 may implement and/or be implemented in one or more communications busses that connect to signal processing and/or control circuit 484 of the set top box 480. The set top box 480 receives signals from a source such as a broadband source and outputs standard and/or high definition audio/video signals suitable for a display 488 such as a television, monitor and/or other video and/or audio output devices. The signal processing and/or control circuit 484 and/or other circuits (not shown) of the set top box 480 may process data, perform coding and/or encryption, perform calculations, format data and/or perform any other set top box function.

The signal processing and/or control circuit 484 may communicate with mass data storage 490 that stores data in a nonvolatile manner. The mass data storage 490 may include optical and/or magnetic storage devices such as hard disk drives (HDDs) and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The signal processing and/or control circuit 484 may be connected to memory 494 such as RAM, ROM, low latency nonvolatile memory such as flash memory and/or other suitable electronic data storage. The signal processing and/or control circuit 484 also may connect with a WLAN via a WLAN network interface 496. The set top box 480 may include a power supply 483.

Figure 6F:
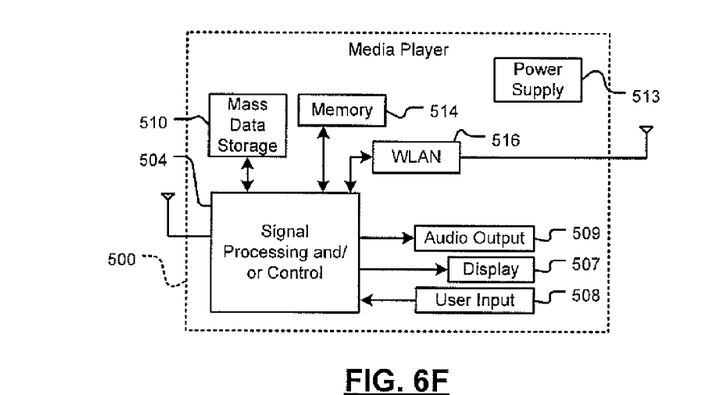
FIG. 6F is a functional block diagram of a media player.

Referring now to FIG. 6F, communication bus 108 can be implemented in one or more communications busses that connect to a signal processing and/or control circuit 504 of a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuit 504 and/or other circuits (not shown) of the media player 500 may process data, perform coding and/or encryption, perform calculations, format data and/or perform any other media player function.

The signal processing and/or control circuit 504 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices such as hard disk drives (HDDs) and/or DVD drives. At least one HDD may have the configuration shown in FIG. 2 and/or at least one DVD may have the configuration shown in FIG. 6A. The HDD may be a mini HDD that includes one or more platters having a diameter that is smaller than approximately 1.8". The signal processing and/or control circuit 504 may be connected to memory 514 such as RAM, ROM, low latency nonvolatile memory such as flash memory and/or other suitable electronic data storage. The signal processing and/or control circuit 504 also may connect with a WLAN via a WLAN network interface 516. The media player 500 may include a power supply 503. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A system-on-chip comprising:
 a processor;
 a control module; and
 a communication bus configured to provide a communication link between the processor and the control module, wherein the communication bus comprises
  a first plurality of data registers configured to store data,
  a plurality of address registers configured to respectively store addresses corresponding to selected ones of the first plurality of data registers,
  a second plurality of data registers configured to, while the processor is not reading data from the first plurality of data registers, respectively receive data from the selected ones of the first plurality of data registers, and
  a first selection module configured to, in response to a request for data from the processor corresponding to a first address,
   provide the data from one of the second plurality of data registers to the processor in response to the first address matching one of the addresses stored in the plurality of address registers, otherwise
   provide the data from one of the first plurality of data registers to the processor in response to the first address not matching one of the addresses stored in the plurality of address registers.

2. The system-on-chip of claim 1, wherein the first selection module comprises a multiplexer.

3. The system-on-chip of claim 1, further comprising a second selection module configured to respectively copy data from the respective ones of the first plurality of data registers to the second plurality of data registers.

4. The system-on-chip of claim 3, wherein the second selection module comprises a multiplexer.

5. The system-on-chip of claim 1, wherein the second plurality of data registers are configured to respectively receive data periodically from the respective ones of the first plurality of data registers.

6. The system-on-chip of claim 1, wherein the second plurality of data registers are configured to respectively receive data from the respective ones of the first plurality of data registers without interaction from the processor or the control module.

7. The system-on-chip of claim 1, wherein the respective ones of the first plurality of data registers are pre-selected by the processor or the control module.

8. The system-on-chip of claim 1, wherein the addresses are stored in the plurality of address registers in an arbitrary order.

9. The system-on-chip of claim 1, wherein:
the processor is configured to assert a read signal while reading data from the first plurality of data registers, and
the second plurality of data registers are configured to respectively receive data from the respective ones of the first plurality of data registers only while the read signal is not asserted by the processor.

10. The system-on-chip of claim 1, wherein the control module comprises one or more of a spindle/VCM (voice coil motor) module, a servo timing controller module, a read channel interface module, an IRQ (interrupt request) controller module, a serial port controller module, or a servo monitor module.

11. A method of operating a system-on-chip including a processor, the method comprising:
storing data associated with a control module in a first plurality of data registers;
respectively storing addresses corresponding to respective ones of the first plurality of data registers in a plurality of address registers;
while the processor is not reading data from the first plurality of data registers, respectively copying data from the respective ones of the first plurality of data registers into a second plurality of data registers; and
in response to a request for data from the processor corresponding to a first address,
providing the data from one of the second plurality of data registers to the processor in response to the first address matching one of the addresses stored in the plurality of address registers, otherwise
providing the data from one of the first plurality of data registers to the processor in response to the first address not matching any of the addresses stored in the plurality of address registers.

12. The method of claim 11, further comprising:
selecting one of the second plurality of data registers in response to the first address; and
providing data from the selected one of the second plurality of data registers to the processor.

13. The method of claim 12, wherein the selecting is performed by a multiplexer.

14. The method of claim 11, wherein the copying is conducted by a multiplexer.

15. The method of claim 14, wherein the copying is conducted periodically.

16. The method of claim 14, wherein the copying is conducted without interaction from the processor or the control module.

17. The method of claim 11, wherein the respective ones of the first plurality of data registers are pre-selected by the processor or the control module.

18. The method of claim 11, wherein the addresses are stored in the plurality of address registers in an arbitrary order.

19. The method of claim 11, further comprising:
asserting, by the processor, a read signal when reading data from the first plurality of data registers; and
copying data into the second plurality of data registers receive data from the respective ones of the first plurality of data registers only while the read signal is not asserted by the processor.

* * * * *